March 2, 1937.　　　　J. R. JAMES　　　　2,072,335

REVERSIBLE VARIABLE SPEED MOTOR

Filed Nov. 25, 1935

Inventor:
John R. James
by Harry C. Roberts
Attorney.

Witness: H. Klein

Patented Mar. 2, 1937

2,072,335

UNITED STATES PATENT OFFICE 2,072,335

REVERSIBLE VARIABLE SPEED MOTOR

John R. James, Story City, Iowa

Application November 25, 1935, Serial No. 51,353

11 Claims. (Cl. 172—278)

This invention relates to electric motors and more particularly to alternating current reversible variable speed motors, although certain features thereof may be employed with equal advantage for other purposes.

It contemplates more especially the provision of novel means for manually varying and controlling the speed of self-starting electric motors so as to render such more adaptable and flexible in situations where electric motors are necessary or desirable.

One object is to simplify the construction and improve the operation of the devices of the character mentioned.

Still another object is to provide simple and improved manual means for controlling the directional rotation and varying the speed of electric motors.

Another object of my invention is the provision of a motor for use with alternating currents to generate alternating magnetic flux that will induce currents in adjustable segments of metal which are magnetic so as to provide self-starting characteristics and substantially uniform speed of a rotor or armature.

A further object of my present invention is the provision of an electric motor for use in an alternating current circuit to create an alternating magnetic flux that will induce currents in adjustable segments of non-magnetic metal and rotors to provide a rotor propelling torque in either direction or combined with a rotor opposing torque in either direction and also at a substantially uniform speed irrespective of voltage and frequency variations in the alternating current circuit.

A still further object of my invention is to provide electric motors with one or more electromagnets for use with alternating currents of different voltages and frequencies to generate an alternating magnetic flux that will induce currents in adjustable segments which are made of varied mixtures of non-magnetic and magnetic metal as a means to provide self-starting characteristics of a rotor or armature in either direction at either an ungovernable or substantially uniform speed, or also to completely stop a rotor or armature while the motor is still connected to an alternating current circuit.

Still another object of my present invention is the provision of electric motors having one or more electromagnets for use on alternating currents of different voltages and frequencies to generate an alternating flux that will induce currents in segments of non-magnetic and magnetic metal as a means which will have a tendency to close a magnetic field and also provide a rotor propelling torque in either direction or combined with a rotor opposing torque in either direction and also at substantially uniform speeds irrespective of voltage and frequency variations in alternating current circuits.

The objects just mentioned above are improvements on my self-starting motors for alternating currents on which I received United States Letters Patent No. 2,016,603 dated October 8, 1935. The drawing herein annexed clearly shows much of the construction of the above-mentioned patent and all of my new improvements which are further described in this specification.

Various other objects and advantages will appear from the following description, reference being made to the accompanying drawing for an illustrative embodiment of my invention.

Figure 1:
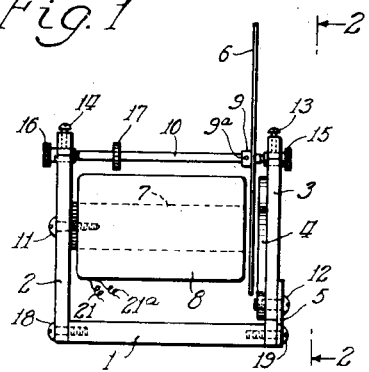
Fig. 1 is a side elevation of a motor embodying the principles of my invention.

Referring now to the drawing in which like reference characters indicate the same parts in the different views, the structure selected for illustration (Figs. 1 and 2) comprises a motor having, in this instance, a rotor 6 having a disc shape though not essentially so, is constructed of electrically conductive non-magnetic metal, for example copper or aluminum or even containing portions of magnetic metal. The rotor 6 is, in this instance, attached to a hub 9 which is mounted and held in place by a set screw 9a on an axial shaft 10 of preferably hardened metal with both ends tapered for rotation in confronting relation with a single field coil 8 having a laminated or solid core 7 of magnetic metal extending to its full length.

The coil 8 with its core 7 is preferably positioned so that its longitudinal axis is parallel to the shaft 10 and laterally offset therefrom within the confines or limits of the rotor 6 having its plane surface disposed normal thereto and adjacent one end of the coil 8 and its core 7.

The base bar 1 is preferably made of magnetic metal so as to have a tendency to provide a path for some of the alternating magnetic flux which passes from one end of the coil 8 and core 7 to the other end. The end bar 2, also preferably made of magnetic metal so as to provide a path for some of the alternating magnetic flux that passes from one end of the coil 8 and core 7 to the other end, is attached to the base bar 1 by two screws 18 and is so positioned that its one face is adjacent the free end of the coil 8 and core 7. The end bar 2 serves to support the core 7 and coil 8, which are attached thereto by a tapered screw 11. Further, the bar 2 serves to support one end of the shaft 10 by means of the adjustable cup bearing 16 preferably of hardened metal (or other bearings of a standard construction not shown) which can be locked in place by the screw 14. The gear 17 pressed on the shaft 10 serves to connect the motor to other mechanisms not shown.

Another end bar 3 which can be made of magnetic metal or of non-magnetic metal or of both magnetic and non-magnetic metal combined, depending upon the purpose it is to serve, is attached to the base bar 1 by screws 19. The end bar 3 has its one face positioned adjacent to the face of the adjustable segment 4, opposite that of the face in closely spaced relation to the rotor 6. The end bar 3 serves also as a support for the other end of the shaft 10 by means of the adjustable cup bearing 15 (or other bearings of standard construction not shown) which can be locked in place by the screw 13. Further, the end bar 3 serves as a support for the adjustable segment 4 which can be locked thereto by the magnetic screw 12. If the end bar 3 be of magnetic metal then it can also serve to provide a path for some of the alternating magnetic flux. The end piece 5 of magnetic metal is also attached to the end bar 3 by the magnetic screw 12 and also the magnetic screws 19, said end piece 5 also providing a path for some of the alternating magnetic flux due to it being magnetic, which may be omitted entirely when the adjustable segment is non-magnetic and the end bar 3 is magnetic.

The adjustable segment 4 can be made of pure non-magnetic metal or of pure magnetic metal and it also can be made of varied mixtures of magnetic metal and non-magnetic metal combined. The adjustable segment 4 is so positioned that its one face is adjacent the other face of the rotor 6 opposite that of the coil 8 and core 7. It is not absolutely necessary that the adjustable segment 4 have a fan shape as illustrated, but this shape was found to be more desirable, in that when it is adjusted for maximum speed of the rotor 6, either of its radial edges 22 or 23 can be positioned in linear alignment with the axis of the one end of the core 7 and coil 8 as shown by dot-dash line 24 of dotted-line position, also so as to extend over the one end of the core 7 and coil 8 in a direction normal to the shaft 10. The lead wires 21 and 21a are for connection of the coil to the alternating circuit.

The dotted-line position of the adjustable segment 4 with radial edges defined by numbers 24 and 25 represents the extent of the adjustment for maximum speed of the rotor 6. This same adjustment of the segment 4 can be made in the opposite direction so as to change the direction of rotation of the rotor 6, or the segment 4 can be stopped at various points over the end of the core 7 and coil 8 so as to cause the rotor 6 to run at variable speeds and at substantially uniform speeds. Further, the segment 4 can be adjusted so as to completely stop the rotor 6 while the motor is still connected to the alternating current circuit. Thus it is understood that the mere adjustment of the segment 4 can provide a rotor propelling torque in either direction or the rotor propelling torque can be combined with a rotor opposing torque to maintain substantially uniform speeds, or it can be adjusted so as to stop the rotor 6 completely. It is not necessary that the base bar 1, and end bars 2 and 3 be of the shapes or sizes as shown in order to be effective; this applies to the coil and core and all other parts of the motor as well.

Figure 3:
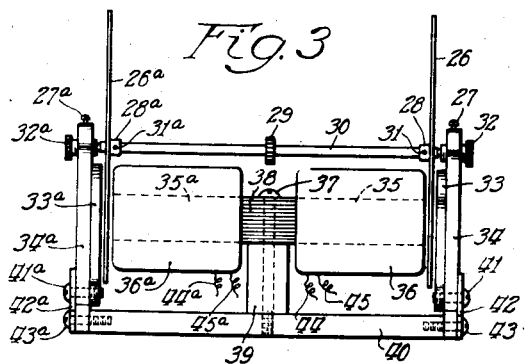
Fig. 3 is a view similar to Fig. 1 but with two rotors and two sets of adjustable segments.
Figure 6:
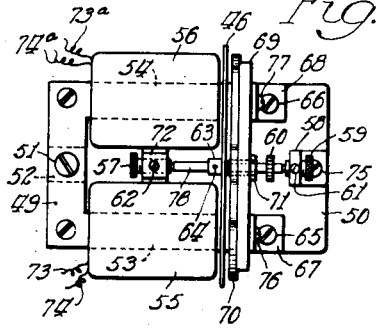
Fig. 6 is a plan view on line 6—6 of Fig. 4.

A modified embodiment of my invention is illustrated in Figure 3 wherein a pair of field coils 36 and 36a having laminated or solid cores 35 and 35a of magnetic metal extending to their full length and so positioned that one end of coil 36 and core 35 is in closely spaced relation to one face of the rotor 26 while the one end of coil 36a and core 35a is positioned in closely spaced relation to one face of the rotor 26a. These coils 36 and 36a may be connected in series or parallel, but always so that they will have opposite polarities at their ends adjacent the rotors 26 and 26a. The cores 35 and 35a are connected together at the center by a laminated or solid core piece 38 of magnetic metal, or may be a continuation of cores 35 and 35a. The core 38 is attached to the base bar 40, which is of magnetic metal, by means of the screw 37 and post 39 also of magnetic metal.

The end bars 34 and 34a of either magnetic or non-magnetic metal or of magnetic and non-magnetic metal combined, are attached to the base bar 40 of magnetic metal by screws 43 and 43a and serve as supports for both ends of the shaft 30 by means of adjustable cup bearings 32 and 32a preferably of hardened metal (or other bearings of standard construction not shown) which are locked in place by screws 27 and 27a. I have found that the use of cup bearings with a shaft having tapered ends makes a good bearing arrangement for a motor because the friction caused by rotation is reduced to a minimum and little or no oil is needed. A rotor 26 having a disc shape, though not essentially so, is constructed of electrically conductive non-magnetic metal, for example copper or aluminum or even containing portions of magnetic metal, is attached to the hub 28 which is mounted and held in place by a set screw 31 on the shaft 30, preferably of hardened metal, which has both ends tapered. The rotor 26a in this instance is attached to the hub 28a which is mounted and held in place by a set screw 31a on the shaft 30. The terminals or lead wires 44, 45, 44a, and 45a are for connection of the coils 36 and 36a to the alternating current circuit.

The gear 29 pressed on the shaft 30 serves to connect the motor to other mechanisms not shown. The adjustable segments 33 and 33a are attached and locked to the end bars 34 and 34a by the magnetic screws 41 and 41a. The segment 33 is positioned so that its one face is in closely spaced relation to the one face of the rotor 26 opposite that of coil 36 and core 35. The end bar 34 is positioned so that its one face is adjacent the other face of segment 33 opposite the face adjacent the rotor 26. The segment 33a is positioned so that its one face is in closely spaced relation to the one face of the rotor 26a opposite that of coil 36a and core 35a. The end bar 34a is positioned so that its one face is adjacent the other face of the segment 33a opposite the face adjacent the rotor 26a.

Figure 2:
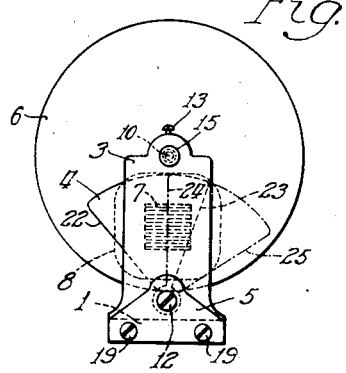
Fig. 2 is an end view taken on line 2—2 of Fig. 1.

The end pieces 42 and 42a of magnetic metal are attached to the outside face of the end bars 34 and 34a by the magnetic screws 41 and 41a and also magnetic screws 43 and 43a, but the end pieces 42 and 42a may be omitted when the end bars 34 and 34a are magnetic and the adjustable segments 33 and 33a are non-magnetic. The adjustable segments 33 and 33a in this motor serve a purpose similar to the adjustable segment 4 as illustrated in Figures 1 and 2. It is not necessary that the base bar 40 and end bars 34 and 34a and other parts of this motor be of the shapes or sizes illustrated to be effective and it is obvious that the motors illustrated in Figs. 1, 2, and 3 can be constructed so as to use several coils and cores with adjustable segments and auxiliary parts as described.

Referring now to Figures 1, 2, and 3 for an explanation as to the principle of operation, and due to the fact that the operation of each coil 36 and 36a in Figure 3 is identical to the operation of the coil 8 in Figures 1 and 2, reference will only be made to a single coil with its core and auxiliary parts.

The explanation of the principle of operation given as follows also applies to each adjustable segment and each coil with core and auxiliary parts as illustrated in Figures 4, 5, 5a, 6, and 7.

In Figure 2 when the terminals or lead wires 21 and 21a are connected to an alternating current circuit, an alternating magnetic flux is generated or produced and emanates outward from the end of the coil 8 and core 7 adjacent the rotor 6 when that end is of a north polarity. Now, then assuming that the adjustable segment 4 is positioned as shown in Fig. 2 and which has radial edges defined by numbers 22 and 23, the alternating magnetic flux simultaneously induces currents in the larger portion of the segment 4 which extends from the axis of the core 7 to the radial edge 22 and also in the smaller portion of the segment 4 which extends from the axis of the core 7 to the radial edge 23 since both portions of the segment 4 are positioned in the path of the alternating magnetic flux. During the next half cycle when the same coil and core ends are of a south polarity, there is then no flux emanation, but the induced currents within the segment 4 which still have a north polarity, are attracted toward the coil 8 and core 7. During the next half cycle when the same coil and core ends are again possessed of a north polarity, then the induced currents which have just previously been attracted, are now repelled by the magnetic flux of a north polarity. At this time, additional currents are induced in the segment 4. Now then, looking at Figure 2 the rotor 6 being positioned directly in the path where the repulsion of the flux and induced currents is the greatest rotates clockwise towards the greatest portion of the segment 4 from the axis of the core 7 to the radial edge 22 because it contains a greater amount of induced currents than does the smaller portion of the segment 4 from the axis of the core 7 to the radial edge 23. Thus it is understood that we now have a rotor propelling torque in the greater portion of the segment 4 and a rotor opposing torque in the smaller portion of the segment 4, so that consequently when there is a change in line voltage or frequency, there is a corresponding change in both the rotor propelling and opposing torque values. Any variation in the speed of the rotor 6 is, therefore, the difference between the two opposing torques or forces that are acting upon the rotor 6 at the time of any variation in the line voltage or frequency. The actual speed variation in the rotor 6 in such instances is, therefore, far less than the usual variations that occur in motors having the usual single directional torque or force acting on the rotor 6. In the latter instances, any variations in line voltage and frequency directly influence the rotor speed a corresponding degree, rather than to an appreciable lesser extent constituting a factor that is the difference in opposing torque valuations present in the structure described.

Now, then if the segment 4 was adjusted so that its greatest portion was from the axis of the core 7 to its radial edge 23 and its smaller portion was from the axis of the core 7 to its radial edge 22, then the rotor 6 would rotate in a counter-clockwise direction from the axis of the core 7 to its radial edge 23, because the rotor propelling torque would be in the opposite direction.

The segment 4 may be adjusted at various points over the coil 8 and core 7 so as to provide many different speeds in either direction and a more or less substantially uniform speed if so desired, and it is therefore understood that the more equally the adjustable segment 4 be centered over the end of the coil 8 and core 7, the more uniform will be the speed of the rotor 6 because the portions of the segment 4 will be more equal on each side of the axis of the core 7 and coil 8 which will result in a more equal rotor propelling torque and rotor opposing torque, thus enabling the rotor 6 to run at a more uniform speed during greater variations in voltage and frequency in the alternating current circuit. The segment 4 may be adjusted equally over the end of the coil 8 and core 7 so as to completely stop the rotation of the rotor 6 in either direction even while the motor is still connected to the alternating current circuit.

The dotted-line position of the adjustable segment 4 with its radial edges defined by numbers 24 and 25 represents the extent of the adjustment for maximum speed of the rotor 6, and when it is positioned with its one radial edge 24 in linear alignment with the axis of the core 7 and its other radial edge 25 to the right as illustrated, then the rotor 6 rotates in a counter-clockwise direction at maximum speed from the axis of the core 7 to the radial edge 25 of the segment 4 because there is now only a rotor propelling torque and no opposing torque.

If the adjustable segment 4 be reversed so that it is positioned with its one radial edge 25 in linear alignment with the axis of the core 7, then the rotor 6 will rotate in a clockwise direction at maximum speed because there is then only a rotor propelling torque and no opposing torque.

Now when the segment 4 has all or a part of its contents made of magnetic metal, the end bar 3 does not need to be of magnetic metal in order to provide a path for a part of the alternating magnetic flux and induced currents which pass from one end of the coil 8 and core 7 to the other end so as to have a tendency to close the magnetic field and thereby increase the efficiency of the whole motor. If the segment 4 be magnetic as above described, then some of the flux and currents can alternate back and forth from the segment 4 through the magnetic screw 12, end piece 5, screws 19, base bar 1, and end bar 2 into the core 7.

If the adjustable segment 4 be made of only non-magnetic metal, then it would be advisable to have the end bar 3 made of magnetic metal so as to provide a path for some of the flux and currents. The explanation just given above also applies to the motor shown in Fig. 3. The explanation of the principle of operation just given applies to each segment shown in all the different embodiments of my invention as illustrated in Figures 4, 5, 5a, 6, and 7.

Another modified embodiment of my invention is illustrated in Figures 4, 5, 5a, and 6 wherein a pair of field coils 55 and 56 having laminated or solid cores 53 and 54 extending to their full length serve to provide an alternating magnetic flux when connected to an alternating current circuit by the terminals or lead wires 73 and 73a and also 74 and 74a. The coils 55 and 56 may be connected in series or parallel but always so as to have opposite polarities at their free ends adjacent the rotor 46. A rotor 46 having a disc shape though not essentially so, is constructed of electrically conductive non-magnetic metal for example copper or aluminum although it could contain some magnetic metal, is mounted on the shaft 78 preferably of hardened metal which is tapered at both ends and is disposed intermediate the coils 55 and 56 which are in spaced parallel relation therewith.

The one end of the coils 55 and 56 and the one end of the cores 53 and 54 are positioned in closely spaced relation to one face of the rotor 46 and are laterally offset therefrom within the confines or limits of the rotor 46, while the ends of the cores 53 and 54 opposite the rotor 46, are connected together by a yoke 49 of laminated or solid magnetic metal and serve to close the alternating magnetic fields of the cores 53 and 54 at that point. The terminals or lead wires 73, 74, 73a, and 74a are for connection of the coils 55 and 56 to the alternating current circuit.

Figure 5:
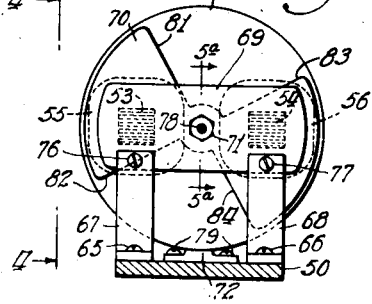
Fig. 5 is a section on line 5—5 of Fig. 4.
Figure 5A:
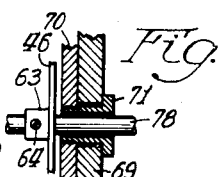
Fig. 5a is a section on line 5a—5a of Fig. 5 on an enlarged scale showing segment locking means.

The base for the whole motor is numbered 50. Post 52 is a support for the yoke 49 which holds the cores 53 and 54 together with coils 55 and 56, the post 52 and yoke 49 being attached together to the base 50 by a screw 51. The post 72 is attached to the base 50 by screws 79 and serves to support one end of the shaft 78 between the coils 55 and 56 by means of an adjustable cup bearing 57, preferably of hardened metal (or other bearings of standard construction not shown) which can be locked in place by the screw 62. The post 58 is attached to the base 50 by screw 75 and serves as a support for the other end of the shaft 78 opposite the first-named end by means of a cup bearing 59, preferably of hardened metal (or other bearings of standard construction not shown) which can be locked in place by the screw 61. I have found that the use of cup bearings with a shaft having tapered ends makes a good bearing arrangement for a motor because the friction caused by rotation is reduced to a minimum and little or no oil is needed. The gear 60 is pressed on the shaft 78 and serves as a means to couple the motor to other mechanisms not shown. The adjustable segment 70 which is defined by radial edges 81, 82, 83, and 84 and which can be constructed of either magnetic metal or non-magnetic metal or of various mixtures of magnetic and non-magnetic metal combined and which has two sectors, each approximately one quadrant of a circle, though not essentially so, is positioned within the confines or limits of the rotor 46 so that its one face is in closely spaced relation to the face of the rotor 46 opposite that face in closely spaced relation to the coils 55 and 56 and cores 53 and 54. The stationary segment 69 of either magnetic or non-magnetic metal or magnetic and non-magnetic metal, and having a shape similar to a bar, though not essentially so, is positioned within the confines or limits of the rotor 46 so that its one face is adjacent the other face of the adjustable segment 70 opposite the face in closely spaced relation to the rotor 46. The adjustable segment 70 has its center threaded as shown in Figure 5a for the locking means 71, which has threads near its end opposite the hexagon shaped portion. The locking means 71 has a substantially large hole through its entire length so that the shaft 78 can pass through and rotate within the locking means 71, without touching said locking means.

The stationary segment 69 as shown in Figure 5a has a hole in its center sufficiently large to permit free passage and turning of the locking means 71, so that when the desired adjustment of the adjustable segment 70 has been made, then it can be locked to the stationary segment 69 by the locking means 71. The two posts 67 and 68 are attached to the base by the screws 65 and 66 and are also attached to the stationary segment 69 by the screws 76 and 77 so as to serve as a support for both the stationary segment 69 and the adjustable segment 70. When the adjustable segment 70 contains magnetic metal then it is not necessary that the stationary segment 69 contain magnetic metal, because the adjustable segment 70 will have a tendency to close the magnetic fields of the cores 53 and 54 because it is always positioned so as to be in at least a part of the path of the alternating magnetic flux, and further it serves to provide a rotor propelling torque in either direction or combined with a rotor opposing torque for rotation of the rotor 46 at a substantially uniform speed irrespective of voltage and frequency variations, said adjustable segment when adjusted can provide various rotor speeds or also stop a rotor completely while the field coils are connected to the alternating current circuit. When the adjustable segment 70 contains only non-magnetic metal then it is desirable to have the stationary segment 69 contain magnetic metal so that it will have a tendency to close the magnetic fields of the cores 53 and 54 due to it being positioned in the path of the alternating magnetic flux. The coils and cores together with their segments and other parts just mentioned need not be of these shapes and sizes to be effective; and it is obvious that the motor can be constructed so as to use several coils and cores with their segments and other parts.

Figure 4:
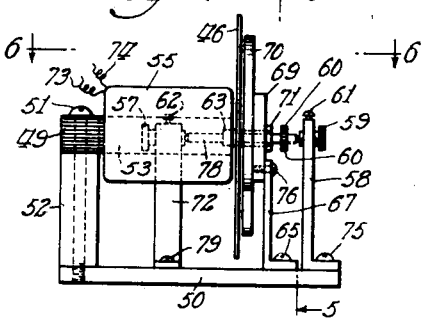
Fig. 4 is a side elevation of a modified form of motor with an adjustable segment having two sectors.
Figure 7:
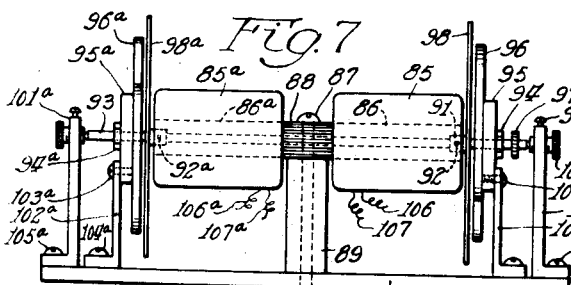
Fig. 7 is a view similar to Fig. 4 but having two rotors and two sets of adjustable segments each segment having two sectors.

Another modified embodiment of my invention which is similar to Fig. 4 is illustrated in Fig. 7 wherein four field coils having cores extending to their full length are used together with two rotors having a disc shape though not essentially so, are constructed of electrically conductive non-magnetic metal, for example copper or aluminum or with portions of magnetic metal, also two adjustable segments and auxiliary parts. Fig. 5 could serve as a section of Fig. 7 similar to section 5—5 of Fig. 4, except that post 72 and screws 79 would be omitted; and Fig. 6 could serve as a plan view if substantially all parts were duplicated as shown in Fig. 7. Coil 85 and core 86 of laminated or solid metal together with its duplicate coil and core (not shown) of laminated or solid metal, but in parallel relation therewith, are positioned so that their one end is in closely spaced relation to one face of the rotor 98 which is constructed of electrically conductive non-magnetic metal, for example copper or aluminum, although it could contain some magnetic metal, while coil 85a and core 86a of laminated or solid metal together with its duplicate coil and core of laminated or solid metal (not shown) but in parallel relation therewith are positioned so that their one end is in closely spaced relation to one face of the other rotor 98a, which is constructed of electrically conductive non-magnetic metal, for example copper or aluminum, although it could contain some magnetic metal. One end of the cores 86 and 86a together with the one end of the two duplicate cores (not shown) are connected together by the yoke 88 similar to yoke 49 of Fig. 6 of laminated or solid metal. This yoke 88 together with the coils and cores are supported by the post 89 which is attached to the base 90 by the screw 87.

The terminals or lead wires, 106 and 107 of coil 85 with the terminals or lead wires 106a and 107a of coil 85a together with the duplicate terminals or lead wires of the duplicate coils (not shown) may be connected in series or parallel but always so as to have opposite polarities at their ends adjacent each of the rotors 98 and 98a.

An adjustable segment 96 of magnetic or non-magnetic metal or of both magnetic and non-magnetic metal combined is positioned within the confines or limits of the rotor 98 and so that its one face is in closely spaced relation to the other face of the rotor 98 opposite the coils and cores. The stationary segment 95 of either magnetic or non-magnetic metal or of magnetic and non-magnetic metal combined, is positioned within the confines or limits of the rotor 98 so that its one face is adjacent the other face of the segment 96 opposite the face in closely spaced relation to the rotor 98. A locking means 94 similar to 71 of Fig. 5a attaches the adjustable segment 96 to the stationary segment 95 which in turn is attached to the base 90 by posts 102 and screws 103, the construction being identical to that shown in Fig. 5.

Gear 97 is pressed on the shaft 93 having tapered ends and serves to couple the motor to other mechanisms not shown. The post 101 serves as a support for one end of shaft 93 preferably of hardened metal by means of an adjustable cup bearing 100 preferably of hardened metal or other bearings of standard construction (not shown) which can be locked in place by screw 99. I have found that the use of cup bearings with a shaft having tapered ends makes a good bearing arrangement for a motor because the friction caused by rotation is reduced to a minimum and little or no oil is needed. The post 101 is attached to the base 90 by screw 105.

The adjustable segment 96a of magnetic or non-magnetic metal or of both magnetic and non-magnetic metal combined is positioned within the confines or limits of the rotor 98a and so that its one face is in closely spaced relation to the other face of the rotor 98a opposite the face in closely spaced relation to the coils and cores. A stationary segment 95a of either magnetic or non-magnetic metal or of magnetic and non-magnetic metal combined, is positioned within the confines or limits of the rotor 98a and so that its one face is adjacent the other face of the adjustable segment 96a opposite the face in closely spaced relation to the rotor 98a. The adjustable segment 96a is attached to the stationary segment 95a by the locking means 94a similar to 71 shown in Fig. 5a.

The stationary segment 95a is attached to the posts 102a by screws 103a, and the posts 102a are attached to the base 90 by screws 104a. Post 101a is attached to base 90 by screw 105a, so as to serve as a support for the other tapered end of shaft 93, the construction being identical to that shown on the opposite end of the motor. Rotor 98 with its hub 91 is attached to the shaft 93 by screw 92, while rotor 98a with its hub is attached to shaft 93 by screw 92a. The coils and cores with their auxiliary parts need not be of the shapes and sizes as described in order to be effective and it is obvious that the motors illustrated in Figures 4, 5, 6, and 7 can be constructed so as to use several coils and cores with adjustable segments having several sectors and auxiliary parts similar to those already described. The adjustable segments in the motors just described can be adjusted so as to provide rotation of the rotors or armatures in either direction and at substantially uniform speeds, and they can also be adjusted so as to completely stop the rotors.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

Having described my invention, I claim:

1. A self-starting reversible motor for alternating currents consisting of a stator having a field coil with a core extending to its full length, a non-magnetic disc shaped rotor mounted for rotation so that its one face is in closely spaced relation with one end of the coil and core, an adjustable segment of magnetic and non-magnetic metal combined is positioned for adjustment by a locking magnetic screw so that its one face is in closely spaced relation to the other face of the rotor opposite the coil and core to establish a rotor propelling torque in either direction or combined with a rotor opposing torque to rotate the rotor at variable speeds and also substantially uniform speeds irrespective of voltage or frequency variations or also to stop the rotor completely while the field coil is connected to an alternating current circuit, a non-magnetic end bar serving as a support with a magnetic piece of metal attached to its one face by magnetic screws is positioned so that its other face is adjacent to the other face of the adjustable segment opposite the face adjacent the rotor, and a magnetic base bar with another end bar of magnetic metal serve as supports and also to provide a path for alternating magnetic flux.

2. A self-starting reversible motor for alternating currents consisting of a stator having a field coil with a core extending to its full length, a disc shaped rotor of non-magnetic metal mounted for rotation so that its one face is in closely spaced relation with one end of the coil and core, an adjustable segment of non-magnetic metal is positioned for adjustment by a locking screw so that its one face is in closely spaced relation to the other face of the rotor opposite the coil and core to establish a rotor propelling torque in either direction or combined with a rotor opposing torque to rotate the rotor at variable speeds and also substantially uniform speeds irrespective of voltage and frequency variations or also to stop the rotor completely while the field coil is connected to an alternating current circuit, a magnetic end bar serving as a support and to provide a path for alternating magnetic flux is positioned so that its one face is adjacent the other face of the adjustable segment opposite the face adjacent the rotor, and a magnetic base bar with another magnetic end bar serve as supports and also to provide a path for alternating magnetic flux.

3. A self-starting reversible motor for alternating currents consisting of a field coil with a core extending to its full length, an end bar of magnetic metal positioned so that its one face is attached to the one end of the core serves as a support for one end of a rotor shaft and also to provide a path for alternating magnetic flux, a rotor of electrically conductive metal mounted for rotation so that its one face is in closely spaced relation with the free end of the coil and core, an adjustable segment composed of magnetic and non-magnetic metal is positioned for adjustment by a locking screw so that its one face is in closely spaced relation with the other face of the rotor opposite the face adjacent the coil and core, said adjustable segment serving to establish a rotor propelling torque in either direction or combined with a rotor opposing torque to rotate the rotor at variable speeds and also substantially uniform speeds irrespective of variations in voltage or frequency, or also to stop the rotor completely while the field coil is connected to the alternating current circuit, another end bar of non-magnetic metal serving as a support for a locking magnetic screw and the other shaft end and also a magnetic piece of metal being attached to its one face by magnetic screws, said end bar of non-magnetic metal is positioned so the one face is adjacent the other face of the adjustable segment opposite the face adjacent the rotor, and a base bar of magnetic metal serving to connect two named end bars and so as to provide a path for alternating magnetic flux.

4. A self-starting reversible motor for alternating currents consisting of a field coil with a core extending to its full length, a rotor of electrically conductive metal mounted for rotation so that its one face is in closely spaced relation with one end of the coil and core, an adjustable segment of non-magnetic metal having substantially a fan shape is mounted for adjustment so that its one face is in closely spaced relation to the other face of the rotor opposite the coil and core to provide a rotor propelling torque in either direction or combined with a rotor opposing torque to maintain substantially a uniform rotor speed irrespective of voltage and frequency variations, said adjustable segment when adjusted can provide various rotor speeds or also stop a rotor completely while the field coil remains connected to the alternating current circuit, a base bar of magnetic metal serving as a support and to provide a path for flux, an end bar of magnetic metal attached to one end of the base bar and one end of the core serves as a support for one end of a shaft and also provides a path for flux, another end bar of magnetic metal attached to the other end of the base bar and so as to have its one face adjacent the other face of the adjustable segment opposite the rotor so as to serve also as a support for the other end of the shaft and to provide a path for flux.

5. A self-starting reversible motor for alternating currents consisting of a stator having two field coils positioned in end to end relation with a core extending through to their full length, a shaft mounted for rotation in parallel relation with the two coils and cores, a rotor of non-magnetic metal mounted on the shaft has its one face in closely spaced relation with the one end of a coil and the core, another rotor of non-magnetic metal mounted on the shaft has its one face in closely spaced relation with the one end of the coil and core end opposite the first named coil and core end, two adjustable segments of non-magnetic metal each having substantially a fan shape are mounted for adjustment so that each has one face in closely spaced relation to the other face of a rotor, two end bars of magnetic metal positioned so that each has one face adjacent the other face of an adjustable segment opposite a rotor, a base bar of magnetic metal attached to the two end bars and center post of magnetic metal all serve to provide a path for alternating magnetic flux.

6. A self-starting reversible motor for alternating currents comprising a stator having two field coils with cores extending to their full length, said cores being connected at one end by means of a yoke which serves to close the alternating magnetic fields of the cores, a rotor of electrically conductive non-magnetic metal is mounted on a shaft for rotation so that its one face is in closely spaced relation to and opposite the coils and cores, an adjustable segment composed of non-magnetic and magnetic metal having two sectors each approximately one quadrant of a circle positioned so that its one face is in closely spaced relation to the other face of the rotor opposite the coils and cores, said adjustable segment serving to provide a path for the flux and also a rotor propelling torque in either direction or combined with a rotor opposing torque to maintain substantially uniform rotor speed irrespective of voltage and frequency variations and also to provide various rotor speeds or stop a rotor completely while the field coils are connected to an alternating current, a stationary segment of non-magnetic metal is positioned so that its one face is adjacent the rotor, said stationary segment extends over the ends of both cores, and a locking means for maintaining said adjustable segment in any adjusted position.

7. A self-starting reversible motor for alternating currents consisting of a stator having two field coils with cores extending to their full length to provide an alternating magnetic flux to emanate from their ends, a yoke for connection of the cores at one end so as to provide a path for flux, a rotor of electrically conductive metal mounted for rotation so that its one face is in closely spaced relation with the free ends of the cores and coils, an adjustable segment of non-magnetic metal having two sectors each approximately one quadrant of a circle positioned so that its one face is in closely spaced relation to the other face of the rotor opposite the coils and cores, said adjustable segment serving to provide a rotor propelling torque in either direction or combined with a rotor opposing torque to maintain substantially uniform rotor speeds irrespective of voltage and frequency variations and also to stop the rotor completely while the field coils are connected to an alternating current circuit, a stationary segment of magnetic metal positioned so that its one face is adjacent the other face of the adjustable segment opposite the face adjacent the rotor, said stationary segment extending over the ends of both cores and serves to provide a path for alternating magnetic flux, and locking means for maintaining said adjustable segment in any adjusted position relative to said stationary segment.

8. A self-starting reversible motor for alternating currents consisting of coils with cores extending to their full length, a rotor of electrically conductive non-magnetic metal having one face thereof positioned in closely spaced relation to the one end of each coil and core, an adjustable segment of magnetic and non-magnetic metal combined having several sectors is positioned so that its one face is in closely spaced relation to the other face of the rotor on the side opposite the coils and cores, said adjustable segment having sectors tends to close a magnetic field and also to provide a rotor propelling torque in either direction separately or combined with a rotor opposing torque to establish substantially uniform rotor speeds irrespective of variations in voltage or frequency and also to stop a rotor completely, a stationary segment of non-magnetic metal positioned so that its one face is adjacent the other face of the adjustable segment opposite the face in closely spaced relation to the rotor, and locking means to secure said adjustable segment in any adjusted position to the stationary segment.

9. A self-starting reversible motor for alternating currents comprising coils having cores extending to their full length to provide an alternating magnetic flux, a disc shaped rotor positioned so that its one face is in closely spaced relation to the one end of each coil and core, an adjustable segment of non-magnetic metal having several sectors is positioned so that its one face is in closely spaced relation to the rotor face opposite the coils and cores, said adjustable segment serving to provide a rotor propelling torque in either direction separately or combined with a rotor opposing torque to establish substantially uniform rotor speeds irrespective of voltage and frequency variations and also to entirely stop a rotor, a stationary segment of magnetic metal positioned so that its one face is adjacent to the other face of the adjustable segment opposite the coils and cores, said segment of magnetic metal having a tendency to close a magnetic field, and locking means to secure the adjustable segment to said stationary segment.

10. A self-starting reversible motor for alternating currents consisting of field coils with cores extending to their full length to provide an alternating magnetic flux to emanate from their ends when connected to an alternating current circuit, a rotor mounted for rotation within the field of alternating magnetic flux, an adjustable segment of non-magnetic metal having sectors and mounted for adjustment over the axis of one end of each coil and core and within the field of alternating magnetic flux serves to provide a rotor propelling torque in either direction separately or combined with a rotor opposing torque to establish substantially uniform rotor speeds or to stop a rotor completely, a stationary segment of magnetic metal positioned within the field of alternating magnetic flux serving to close the field of alternating magnetic flux and adjustable locking means for securing the adjustable segment to the stationary segment in any adjusted position.

11. A self-starting reversible motor for alternating currents consisting of a stator having a pair of field coils with cores to provide a field of alternating magnetic flux, a rotor of non-magnetic metal mounted for rotation within the field of alternating magnetic flux, an adjustable segment of magnetic and non-magnetic metal combined and having two sectors is positioned for adjustment within the field of alternating magnetic flux, said adjustable segment having a tendency to close the field of the alternating magnetic flux and also serving to provide a rotor propelling torque in either direction separately or combined with a rotor opposing torque to establish substantially uniform rotor speeds or to stop a rotor entirely, a stationary segment of non-magnetic metal adjacent said adjustable segment and threaded locking means for securing said adjustable segment to said stationary segment in any adjusted position.

JOHN R. JAMES.